May 4, 1937.　　　　C. M. SLOMAN　　　　2,079,585
METHOD AND APPARATUS FOR TESTING TIRES
Filed Sept. 10, 1932　　　3 Sheets-Sheet 2
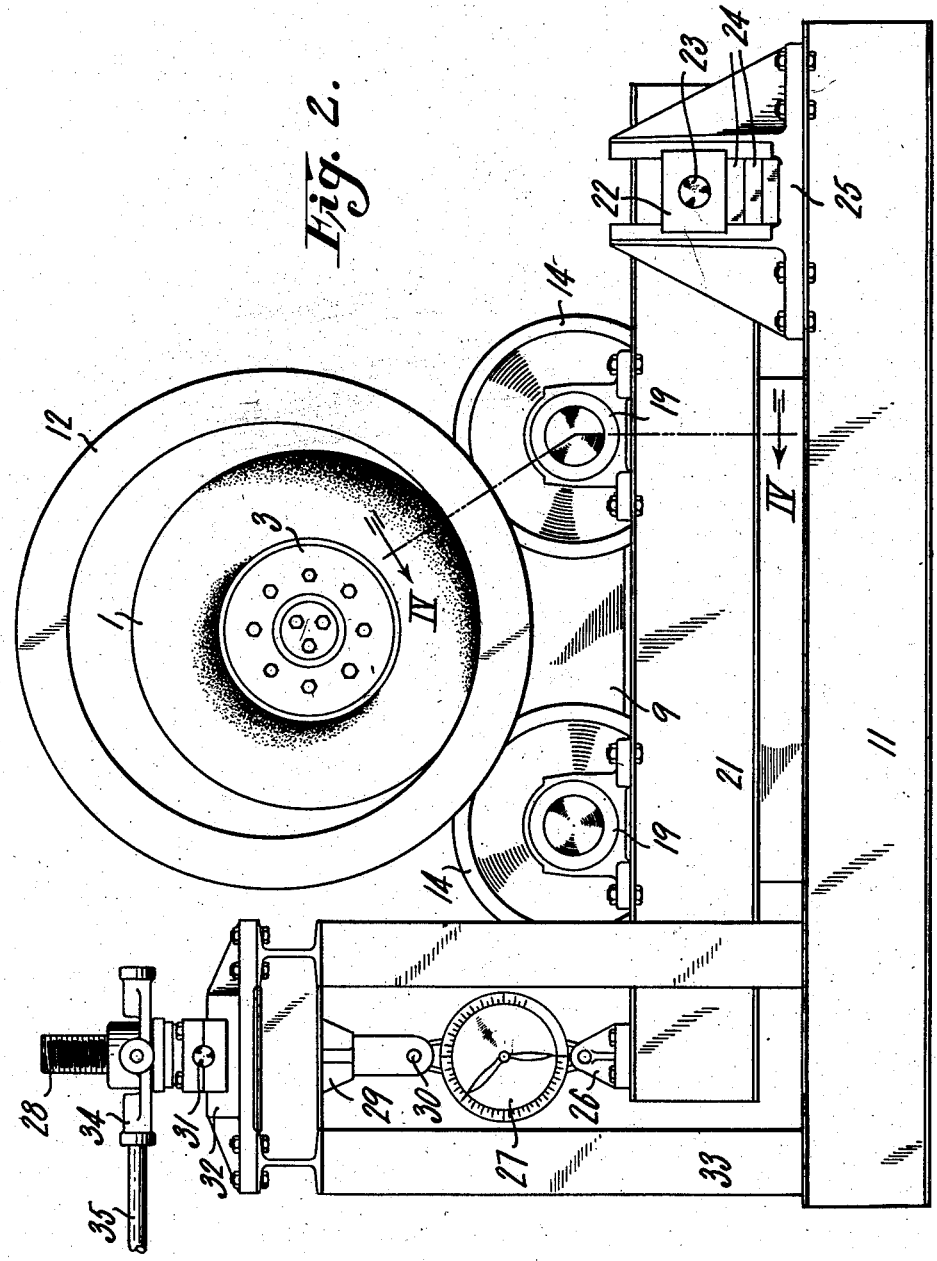
INVENTOR.
CHERI M. SLOMAN
BY
ATTORNEYS.

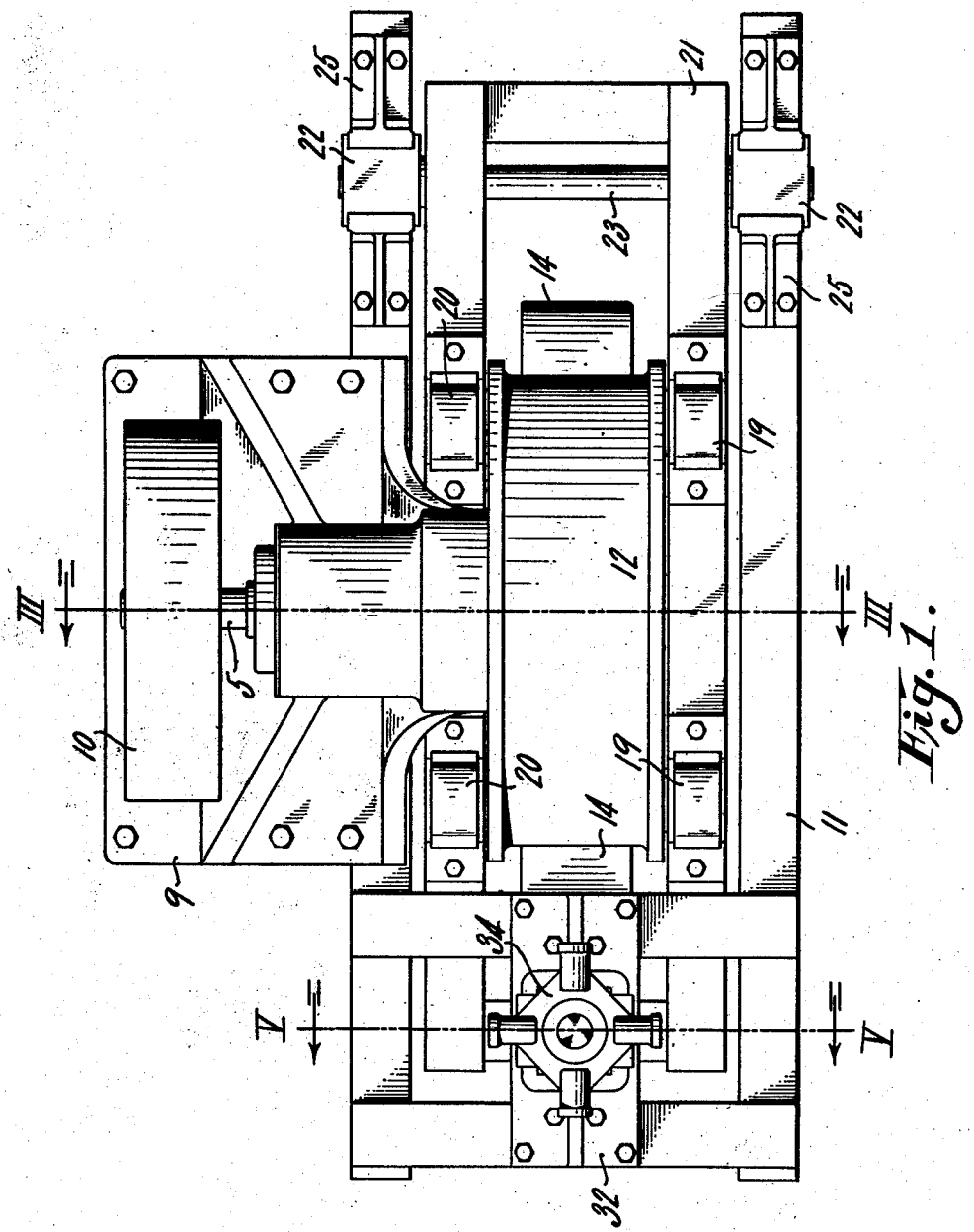

May 4, 1937.  C. M. SLOMAN  2,079,585
METHOD AND APPARATUS FOR TESTING TIRES
Filed Sept. 10, 1932    3 Sheets-Sheet 3
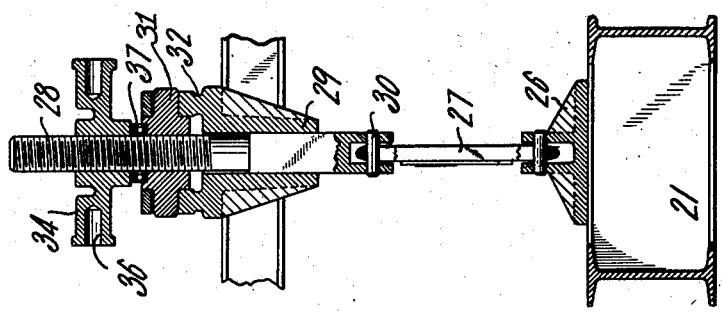
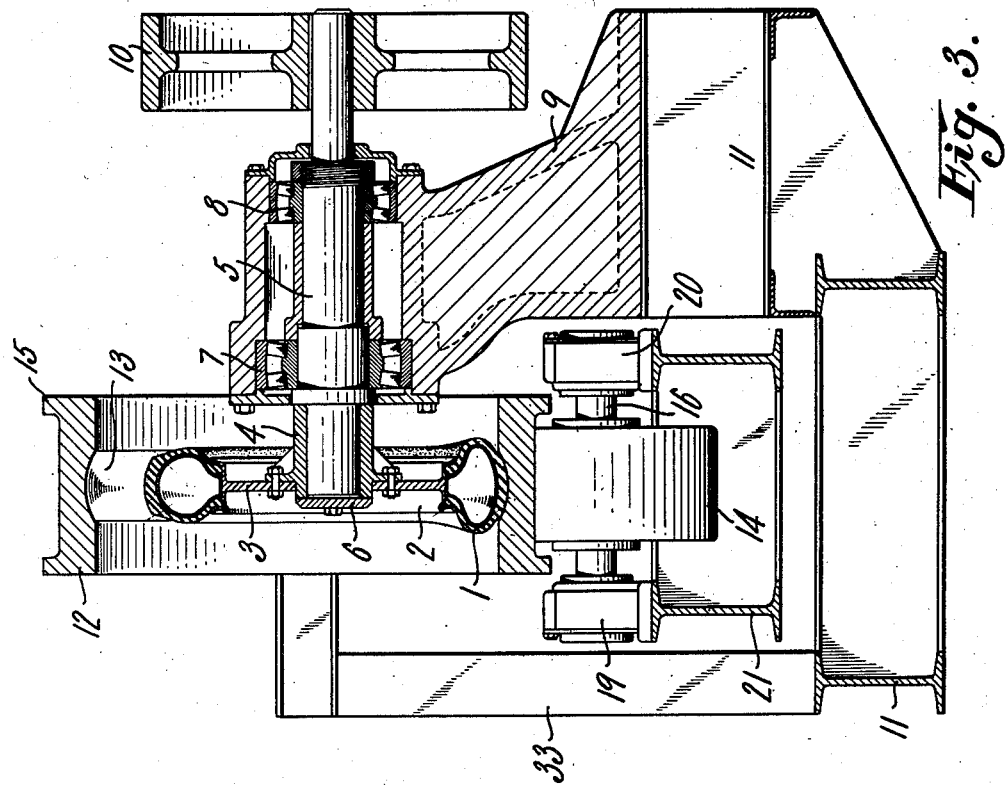
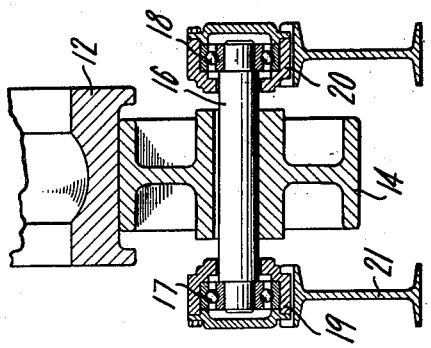
INVENTOR.
CHERI M. SLOMAN
BY
ATTORNEYS.

Patented May 4, 1937

2,079,585

UNITED STATES PATENT OFFICE 2,079,585

METHOD AND APPARATUS FOR TESTING TIRES

Cheri M. Sloman, Detroit, Mich., assignor, by mesne assignments, to United States Rubber Company, New York, N. Y., a corporation of New Jersey Application September 10, 1932, Serial No. 632,576

10 Claims. (Cl. 73—51)

My invention relates to methods of testing tires and tire testing machines, and has for its object to provide a novel type of machine by which tires may be tested in a minimum period of time by a method which produces controlled conditions in localized portions of tires, as herein described. In particular, my invention relates to a tire testing method and machine in which the test reaction is principally confined to the tire sidewalls. In other words, the tread or crown portion of the tire is favored so that the greatest flexing action is carried by the sidewalls of the tire.

The machine of my invention consists primarily of a mounted tire positioned axially horizontal and having driving means, the tire being positioned for contact engagement with a shallow laterally-concaved inner peripheral surface of an annular track member rotatably supported on cradle rollers positioned on a pivoted beam which cooperates with means for applying adjustable predetermined loads.

Among the advantages of my invention are economy in operation and floor space, quickness in results, and uniformity in its application for comparative tests.

Other objects and advantages will appear in the following detailed description when considered in connection with the accompanying drawings, in which:

Fig. 1 is a plan view of the complete apparatus;

Fig. 2 is a side elevational view thereof;

Fig. 3 is an elevational view, in section, taken along lines III—III of Fig. 1;

Fig. 4 is an end elevational view, in section, of a cradle roller, taken along lines IV—IV of Fig. 2; and Fig. 5 is an end elevational view, in section, of the load applying adjustable means, taken along lines V—V of Fig. 1.

Referring to the drawings, and in particular to Fig. 3, the numeral 1 represents an inflated tire mounted on a rim 2. A disc wheel or flange 3 joins the rim 2 with a hub 4 rigidly attached to a horizontal shaft 5 and held in place by a cap 6. The horizontal shaft 5 is supported by roller bearings 7 and 8 which, in turn, are supported by a bracket frame 9.

A pulley 10, positioned at the opposite end of the horizontal shaft 5, may be connected to a prime mover (not shown) from which rotary motion may be imparted to the tire 1.

The bracket frame 9 is supported by a series of structural members 11 which forms a rigid base frame on which the entire machine is mounted.

An annular track member 12 is positioned so that the tire 1 contacts with a concaved surface 13 extending around the inner periphery of the annular track member 12. The track member 12 preferably has an internal diameter greater than the outside diameter of a tire under test so that the tire fits into the surface 13 at the bottom of the track but is free thereof at the top to permit free flexing of the sidewalls of the tire. This member 12 rotatably rests upon cradle rollers 14. Flanges 15 provide safety means on the track member 12 to prevent it from running off the cradle rollers 14. During operation, however, the tire engaging with the concaved surface of the track member holds the member in a central plane so that the flanges 15 do not ordinarily contact with the sides of the cradle rollers 14.

The purpose of the concaved surface at the inner periphery of the track member 12 is to allow the tire to adjust itself relative to the track member, thereby overcoming any side thrust action which might otherwise occur if the track member were definitely held in a central plane relation with the tire. I find that good results are obtained by making the depth of the groove approximately equal to the thickness of the tire tread.

As shown in Fig. 4, each of the cradle rollers is supported in bearings 17 and 18 retained by bearing blocks 19 and 20, respectively. The bearing blocks 19 and 20 are fastened to a beam frame 21 pivoted at one end and supported by adjustable load measuring means at the other end.

The respective shafts in cradle rollers 14 are in parallel relation to the horizontal shaft 5 and, as the lower corners of an isosceles triangle, are spaced equally distant from its vertical center line.

The beam frame 21 is supported at its pivoted end by a slide block 22 retaining a pivot pin 23. Slide block 22 is, in turn, supported by spacer blocks 24, and is guided by a bifurcated bracket 25 fastened to the structural frame 11.

At the opposite end of the beam frame 21 a bracket 26 attached thereto joins with load indicating means such as a dynamometer 27. As shown in Fig. 5, means for adjusting the load is provided by a bar 28 having threads on its upper portion, and forming a square cross section at its lower portion so that, coacting with the guide bracket 29, the bar is not rotatable. Bar 28 pivotally joins at 30 with the dynamometer 27. Bracket 29 forms in part an extension of bracket 32 which is rigidly attached to the upper part of the framework formed by the vertical members 33 extending upward from the base 11. A trunnion 31 pivotally engages with the bracket 32, thus providing for the arcuate movement at the load applying end of the pivoted beam frame 21.

Manual means for applying the load is provided by a threaded spider 34 cooperating with complementary threads of the bar 28. A rod 35 may be inserted in the spider apertures 36 to facilitate, through increased leverage, the vertical movement of the bar 28. A thrust bearing 37, positioned between the spider 34 and the trunnion 31, also facilitates the ease of operation of the adjustable load applying means.

In the operation of the apparatus, the load applying means is adjusted so that the track member 12 is lowered in order that the tire 1 sufficiently clears the track 12 for mounting purposes. When the tire is properly inflated, spider 34 is manually rotated, swinging the beam 21 upward on its pivot, carrying with it the track member 12. After the track member contacts with the tire, the spider 34 may be further adjusted so that the correct predetermined load, caused by the pressure of the tire against the inner peripheral surface of the track member 12, is indicated by the dynamometer 27. When so adjusted, the driving means (not shown) is set into operation, and rotative movement is transmitted to the pulley 10 through the horizontal shaft 5 and to the tire 1. The tire, in turn, rotates the annular track 12, while the cradle rollers 14 support the annular track member in proper axial relation with the horizontal shaft 5, and absorb the peripheral movement of the track member.

As the tread of a tire under test fits into and is supported by the concave surface 13, the entire flexure of that portion of the tire in the zone of engagement with the track is at the tire sidewalls. The load is so adjusted as to give the desired flexing of the sidewalls and bead portions. Since the tire is freed from the track in its upper area, all portions of the tire sidewalls are stressed and released during each revolution. By this method the behavior and break-down characteristics of tire sidewalls and bead portions may be studied.

While I have shown and described a present preferred embodiment of the apparatus of the invention, it is to be understood that the invention may be otherwise embodied and practiced within the spirit thereof and the scope of the appended claims.

Having thus described my invention, what I claim and desire to protect by Letters Patent is:

1. In a method of testing pneumatic tires, the steps comprising supporting a tread portion of a pneumatic tire against deformation, applying a controlled localized load to the tire and flexing the tire side walls and bead portions adjacent said supported tread portion.

2. In a method of testing pneumatic tires, the steps comprising rotating a pneumatic tire along a track, applying a controlled localized load to the tire and supporting the tread portion of the tire in engagement with the track against deformation whereby the tire side walls and bead portions adjacent said supported tread portion are flexed due to the load imposed upon the tires.

3. In a method of testing pneumatic tires, the steps comprising imposing a load on a pneumatic tire, supporting the tread portion of the tire in the load supporting area against deformation, and causing the tire side walls and bead portions in the load supporting area to freely flex.

4. In a method of testing pneumatic tires, the steps comprising imposing a load on a pneumatic tire, supporting the tread portion of the tire in the load supporting area against deformation, applying a controlled and localized load to the tire to cause the tire side walls and bead portions in the load supporting area to freely flex, and moving the tire to cause successive areas of the side walls and bead portions to be flexed.

5. A test track for tires having a groove for engaging and supporting a tire tread, the depth of the groove being approximately the thickness of the tire tread and the contour of the groove being substantially that of the normal contour of the tire tread whereby the side walls only of the tire adjacent the tread portion disposed in the groove are free to flex.

6. A test track for tires comprising a movable band, the inner surface of said band being provided with a groove for engaging a tire tread, the shape and size of said groove conforming to the normal shape and size of the tread portion of a tire under test for supporting the portion of the tire tread in engagement therewith against deformation.

7. A test track for tires comprising a movable band, the inner surface of said band being provided with a groove for engaging a tire tread, the internal dimensions of said band being in excess of the external diameter of a tire under test, and the shape and size of said groove conforming to the normal shape and size of the tread portion of a tire under test for supporting the portion of the tire tread in engagement therewith against deformation.

8. In a tire testing machine, a shaft and wheel for rotatably supporting a tire, a movable band disposed about said shaft and wheel for engaging a tire mounted thereon, stationary supporting means for said shaft, and means for varying the relative position of said shaft and wheel and band for controlling the pressure exerted upon the band by the tire.

9. In a tire testing machine, a permanent shaft and wheel for rotatably supporting a tire, a track movable relatively to said shaft and wheel for engaging a tire mounted on said wheel, said track having a rigid groove therein of a depth to support and confine the tread portion of a tire at the zone of engagement with the track against deformation, means for controlling the load applied to the tire, and means for causing relative movement between said wheel and track to bring successive portions of said tire into engagement with said track.

10. In a tire testing machine, a fixed rotatable shaft and wheel for supporting a tire, a circular track of greater internal dimensions than a tire to be tested disposed eccentrically about said wheel to engage the tire in one area and to be free therefrom in another area, movable supporting means for said track, and means for moving said supporting means for controlling the pressure exerted by the track upon the tire.

CHERI M. SLOMAN.